R. B. BOSTWICK.
VEHICLE TIRE.
APPLICATION FILED JAN. 12, 1920.
1,367,011.
Patented Feb. 1, 1921.
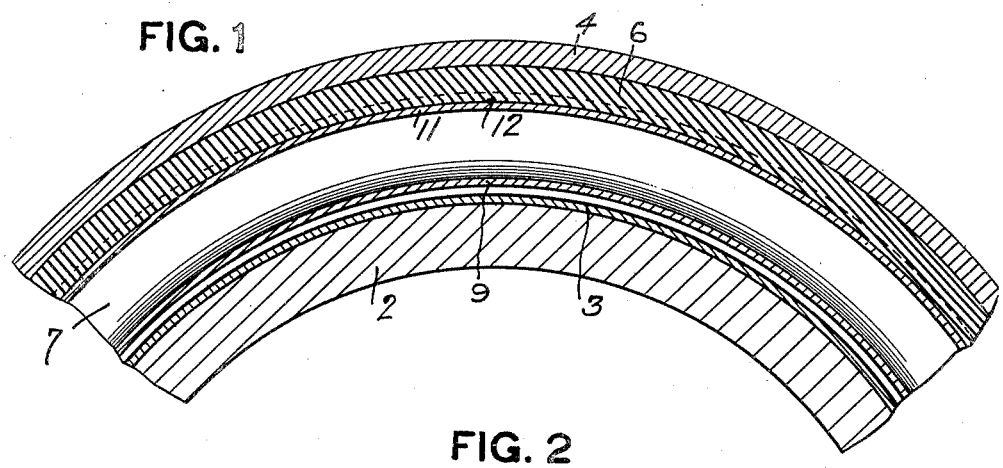
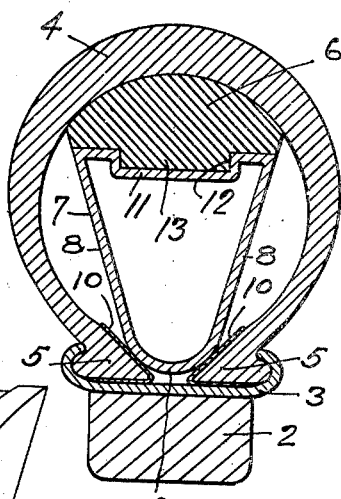
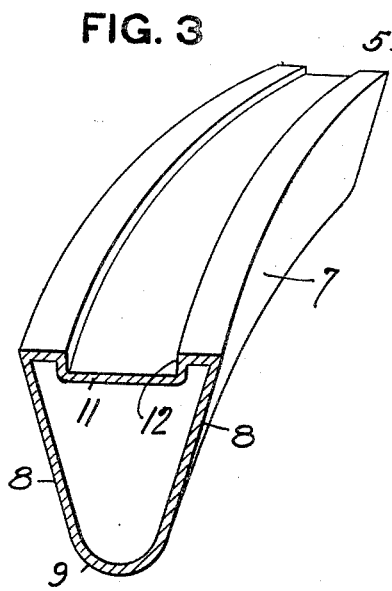
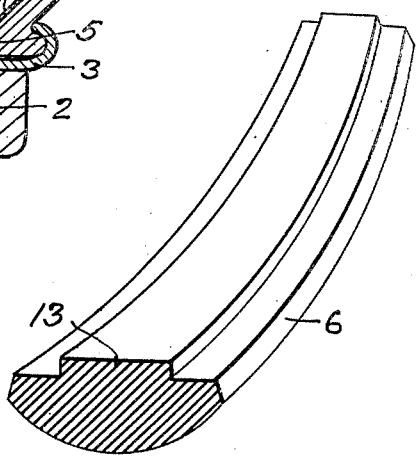
INVENTOR
Rolla B. Bostwick
By Kay & Tatter
Attorneys

UNITED STATES PATENT OFFICE.

ROLLA B. BOSTWICK, OF DUQUESNE, PENNSYLVANIA.

VEHICLE-TIRE.

1,367,011.  Specification of Letters Patent.  Patented Feb. 1, 1921.

Application filed January 12, 1920. Serial No. 350,726.

*To all whom it may concern:*

Be it known that I, ROLLA B. BOSTWICK, a citizen of the United States, and resident of Duquesne, in the county of Allegheny and State of Pennsylvania, have invented a new and useful Improvement in Vehicle-Tires, (Case 2;) and I do hereby declare the following to be a full, clear, and exact description thereof.

My invention relates to vehicle tires.

The object of my invention is to provide a vehicle tire which is resilient in construction and yet non-pneumatic, and while giving all the easy riding effects of a pneumatic tire, it has none of the inconveniences and difficulties due to punctures and blow-outs.

To these ends my invention comprises the novel features hereinafter set forth and claimed.

In the accompanying drawing, Figure 1 is a sectional view of a portion of my vehicle tire; Fig. 2 is an enlarged cross-section of same; Fig. 3 is a sectional perspective view of the supporting member; and Fig. 4 is a like view of the resilient reinforcing member.

In the drawings the numeral 2 designates a suitable felly, and 3 a rim of the ordinary clencher type, although any suitable form of rim may be employed such as one of the demountable type.

The shoe or casing 4 may be of the ordinary construction made of rubber, or rubber and a fibrous material combined, which gives the proper toughness and resiliency to provide ease in riding. The free edges 5 of the shoe or casing 4 are engaged by the rim in the ordinary manner, as shown in Fig. 2.

A reinforcing member 6 is provided which may be a separate member from the shoe or casing or, if desired, might be vulcanized therewith to form an integral structure. This reinforcing member reinforces the tread portion of the shoe or casing, and is made of rubber or other suitable material having the requisite resiliency.

Interposed between the reinforcing member 6 and the free edges of the shoe or casing 4 is the supporting member 7 which may be formed of wood, metal or any other suitable rigid material, and the same is formed hollow so as to reduce the weight, and, where made of metal, said supporting member is preferably made of aluminum which also aids to lighten the structure. This supporting member 7 is made with the converging walls 8 and the nose portion 9 so that said supporting member only engages the shoe or casing 4 at points adjacent the free edges of said shoe or casing thereby tending to force the free edges of the shoe apart and hold them more securely in the recesses of the rim to prevent their displacement therefrom. With the space $9^a$ left between the nose portion 9 of the supporting member 8 and the inner face of the rim 3 sufficient room is allowed for the movement of said supporting member 7 to insure the forcing of the free edges 5 of the shoe into engagement with the rim allowing for the movement of the tapering nose portion of said member along the inclined faces of the free edges, so as to have a wedging action. Interposed between the nose portion 9 of the supporting member 8 and the inner walls of the shoe 4 are the wear-plates 10 which prevent direct contact of the supporting member with the shoe and so reduces the wear occasioned by the rubbing or friction between said supporting member and said shoe.

The inner plate 11 of the supporting member 7 is grooved as at 12 to receive a ribbed portion 13 on the reinforcing member 6 to form a tongue and groove connection between said members.

The supporting member 7 sustains the shoe from the inside and with the resilient reinforcing member 6 sufficient resiliency is provided to give ease in riding, and the shoe is reinforced along its tread portion so that the wear is reduced and at the same time while the tire has practically all the advantages of the pneumatic tire, there are none of the difficulties and inconveniences due to punctures or blow-outs.

What I claim is:

1. In a vehicle tire, the combination of a suitable casing or shoe, a resilient reinforcing member within said casing adjacent the tread portion, and a rigid supporting and wedging member interposed between said reinforcing member and the inner walls of said casing bearing at points opposite thereon adjacent the free edges of said casing but otherwise spaced from the inner walls of said casing, and a rim securing the free edges of said casing.

2. In a vehicle tire, the combination of a suitable casing or shoe, a resilient reinforcing member within said casing adjacent the tread portion, a rigid supporting member disconnected from the said rim and interposed between said reinforcing member and the inner wall of said casing, said supporting member having a nose portion bearing at opposite points on the inner walls of said casing adjacent the free edges thereof and adapted to move radially between the said edges, and a rim securing the free edges of said casing.

3. In a vehicle tire, the combination of a suitable casing or shoe, a resilient reinforcing member within said casing adjacent the tread portion, a hollow rigid supporting member interposed between said reinforcing member and the inner wall of said casing, said supporting member having converging side walls forming a nose portion bearing at opposite points on the inner walls of said casing adjacent the free edges thereof and otherwise spaced from the inner walls of said casing, and a rim securing the free edges of said casing.

4. In a vehicle tire, the combination of a suitable casing or shoe, a resilient reinforcing member within said casing adjacent the tread portion thereof, and a radially movable rigid supporting and wedging member interposed between said reinforcing member and the inner walls of said casing, the said supporting and wedging member being adapted to move radially between the free edges of said casing and thereby to force the said edges apart.

In testimony whereof I, the said ROLLA B. BOSTWICK, have hereunto set my hand.

ROLLA B. BOSTWICK.

Witnesses:
   JOHN F. WILL,
   J. R. KELLER.